United States Patent [19]

Jackson

[11] Patent Number: 5,072,984
[45] Date of Patent: Dec. 17, 1991

[54] VEHICLE CAP WINDOW AND HINGE THEREFOR

[76] Inventor: Willard O. Jackson, 58434 Glenford Dr., Goshen, Ind. 46526

[21] Appl. No.: 653,175

[22] Filed: Feb. 11, 1991

[51] Int. Cl.[5] ............................................. B62D 25/00
[52] U.S. Cl. ...................................... 296/56; 296/156
[58] Field of Search ................... 296/146, 156, 92, 56, 296/190

[56] References Cited

U.S. PATENT DOCUMENTS

| | | | |
|---|---|---|---|
| 2,032,630 | 3/1936 | Northup | 296/92 |
| 4,261,672 | 4/1981 | Chrysler et al. | 296/146 |
| 4,627,655 | 12/1986 | Collins | 296/56 |
| 4,927,206 | 5/1990 | Murdock | 296/156 |

FOREIGN PATENT DOCUMENTS 1377798  9/1964  France .................................. 296/56

*Primary Examiner*—Robert R. Song

[57] ABSTRACT

A frameless truck cap lift door is disclosed having a concealed hinge structure and including a transparent window portion of generally uniform thickness having six holes, two of which extend along an upper edge thereof. There is a relatively rigid support bar having at least a pair of holes which are simutaneously alignable with the window holes. A pair of hinges are adapted to be fastened near an upper edge of the truck cap each hinge having a pivotable arm extending from the truck cap and terminating in an apertured flange. The spacing between the flanges when the hinges are fastened to the truck cap is substantially the same of the spacing between the holes in the support bar and the holes in the window whereby a pair of threaded fasteners may be passed each through the window, the support bar and one flange for securing the window pivotably to the cap. This eliminates any need for a window frame whereby facilitating use of any of a wide variety of window shapes while allowing the use of relatively thin glass for the window.

4 Claims, 3 Drawing Sheets

VEHICLE CAP WINDOW AND HINGE THEREFOR

SUMMARY OF THE INVENTION

The present invention relates generally to vehicle caps such as commonly encountered on pickup trucks and the like, and more particularly to a window construction and an associated hinging arrangement especially suited to such caps. In particular, the window of the present invention is frameless and has a concealed hinge structure.

The art of openable windows on vehicles is quite old, for example, the Northrop U.S. Pat. No. 2,032,630 which was granted in 1936 shows a hinged front windshield with the characteristic frame completely surrounding the glass in keeping with the "stylish trend to rounded tops." The Chrysler and Farrell patents, U.S. Pat. Nos. 4,261,612 and 4,141,109 teach a frameless and supportless relatively thick (for strength) rear window, and a hinge arrangement of a standard wooden door, not a truck cap window or door which hinge lies wholly on one side of the door.

Present technology in the manufacture of truck cap doors is to make an inner frame entirely around the glass panel and to fasten this frame to another frame which is then fastened to the body of the truck cap. Various kinds of locking devices and supporting hardware are fastened to these frames. The most common hinge on currently manufactured cap doors consists of two mated aluminum extrusions, one of which is fastened to the inner frame and the other of which is fastened to the outer frame. These two extrusions interlock with one another in such a way as to form a working (typically overhead) hinge allowing the door to be opened and closed. A hinge of this type limits the upper window configuration to a straight line design as will be noted, for example, in U.S. Pat. Nos. 4,431,221 to Grise and 4,695,083 to Herrmeyer. While most rear windows for such truck caps employ a single centrally located handle having laterally extending locking bars which engage the vertical edges of the cap, the Herrmeyer patent teaches the use of a pair of handles located near the vertical edges of the window. Such handles are, however, located in a window surrounding frame. Some manufacturers have used conventional strap-type hinges fastened to the outside of the door panel and to the outside of the outer frame. Such an arrangement does allow the upper edge of the glass window to be other than straight, but is unsightly and does not provide support for the glass panel. A light weight glass panel will flex and bind the hinges increasing the likelihood that the window will be broken. As a result, windows utilized in this type of installation are thicker, and in some cases approximately twice the thickness of a window mounted according to my inventive technique.

Among the several objects of the present invention may be noted the provision of a vehicle rear window having no frame; the provision of a glass rear window for a truck bed cap having minimal reinforcement; the provision of a glass rear window in accordance with the previous object which is, therefore, of minimal weight; the provision of a hinge structure for an enclosure window which is entirely located within the enclosure; the provision of a window top hinge which allows the entire periphery of the window to be glass rather than metal framework whereby a wealth of window configurations are possible; the provision of a window hinging arrangement requiring minimal hardware; the provision of a hinge design which allows great flexibility in designing cap doors with curved glass, curved edges, and light weight glass, all with a pleasantly "clean" exterior appearance; and the provision of a light weight truck cap lift door.

In general, the truck cap lift door has a plurality of concealed hinges each fastened to the glass window with a single through-the-glass bolt. Thus, a further object of the present invention is the provision of a rear window for a truck cap which is more readily replaced than was heretofore possible. A common support bar through which the through-the-glass bolt also pass extends between the hinges preventing any hinge misalignment and resulting possible glass breakage. This support bar not only maintains hinge alignment, but also provides a stiffening support for the light weight glass panel. A still further object of the present invention is, therefor, the provision of a window with a frame-free periphery having a stiffening bar which maintains hinge alignment while reinforcing the glass. These as well as other objects and advantageous features of the present invention will be in part apparent and in part pointed out hereinafter.

In general and in one form of the invention, a frameless truck cap lift door with a concealed hinge structure includes a transparent window portion of generally uniform thickness with a pair of mounting holes along an upper edge thereof. A relatively rigid support bar is provided having a corresponding pair of holes simultaneously alignable with the window holes. A pair of hinges are adapted to be fastened near an upper edge of the truck cap with each hinge having a pivotable arm extending from the truck cap and terminating in an apertured flange. The spacing between the flanges when the hinges are fastened to a truck cap is substantially the same as the spacing between the holes in the support bar and the holes in the window so that a pair of threaded fasteners may be passed one each through the window, the support bar and one flange for securing the window pivotably to the cap. The pair of holes are near, but spaced from the periphery of the window and the entire periphery of the window is frameless allowing a wide variety of window shapes.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
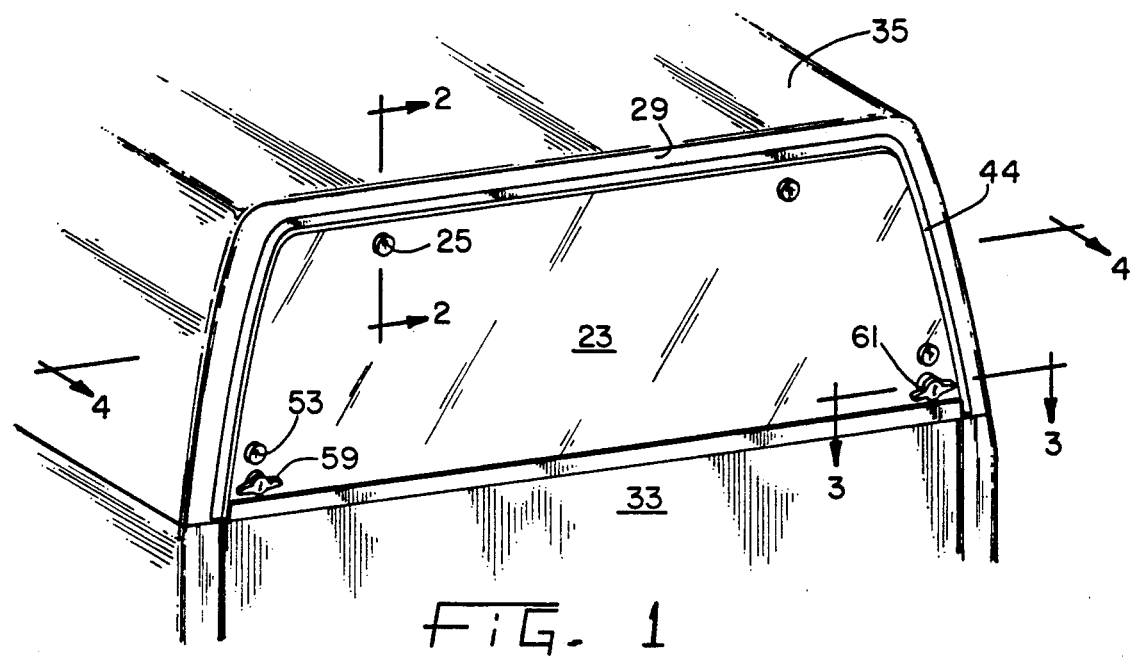
FIG. 1 is a perspective view of the rear portion of a pickup truck having a cap with rear window according to the invention in one form.

FIG. 1 shows a rear window 23 and a portion of a pickup truck bed 31 with a conventional lowerable tailgate 33 and with a cap or camper top 35 covering the bed 31. An interior frame portion 15 extends along the top 29 and two sides of the back opening of the cap. The window 23 seals against this frame 15 along the top and two sides while it seals against tailgate 33 along the bottom. Two hinges 35 and 37 are bolted to this frame by bolts such as 39 and 41, with each hinge having a fixed portion 17 bolted to the frame 15 and movable portion 21 attached thereto at pivot point 19. The two movable portions 21 are bolted to the window 23 by bolts or similar threaded fasteners such as 25 which extend through the glass 23 and through the L-shaped support bar 27. Support bar 27 is much like a piece of angle iron in cross-section and extends between the hinges so that both movable hinge portions are bolted to the support bar 27. The bar stiffens the glass so that thinner glass may be used. With the two separates hinges, the window periphery such as the upper edge 43 or sides 44 may now be curved rather than straight. A rubber seal such as 45 may extend around the inner frame 15 sealing it to cap 29 and a further seal 47 may be positioned between the glass window 23 and the frame 15.

Figure 2A:
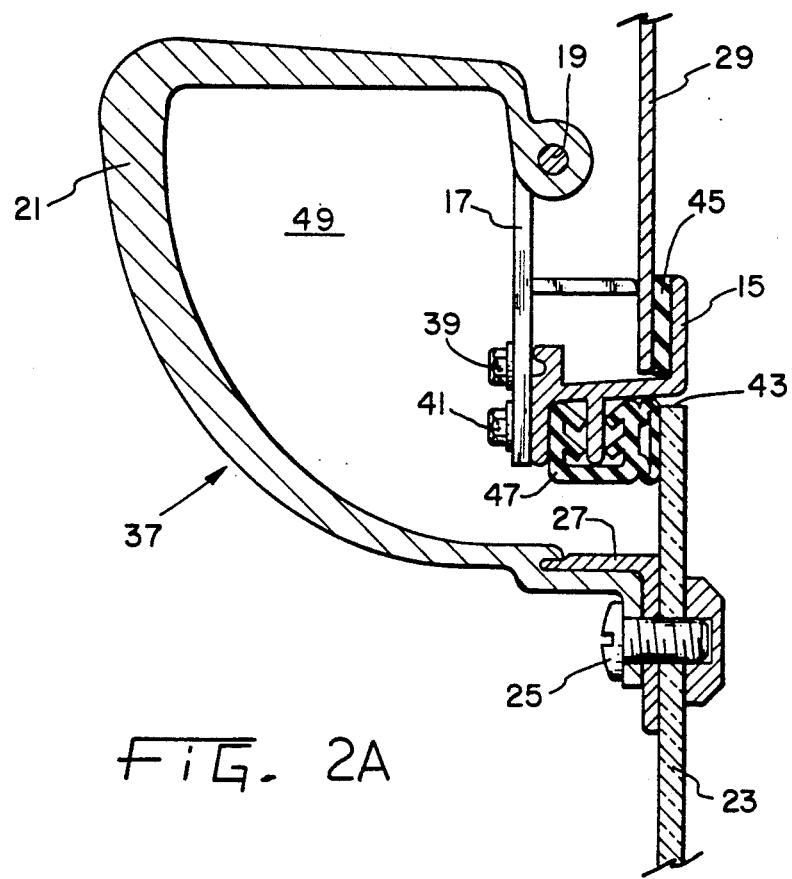
FIG. 2A is a view in cross-section along the lines 2—2 of FIG. 1.
Figure 2B:
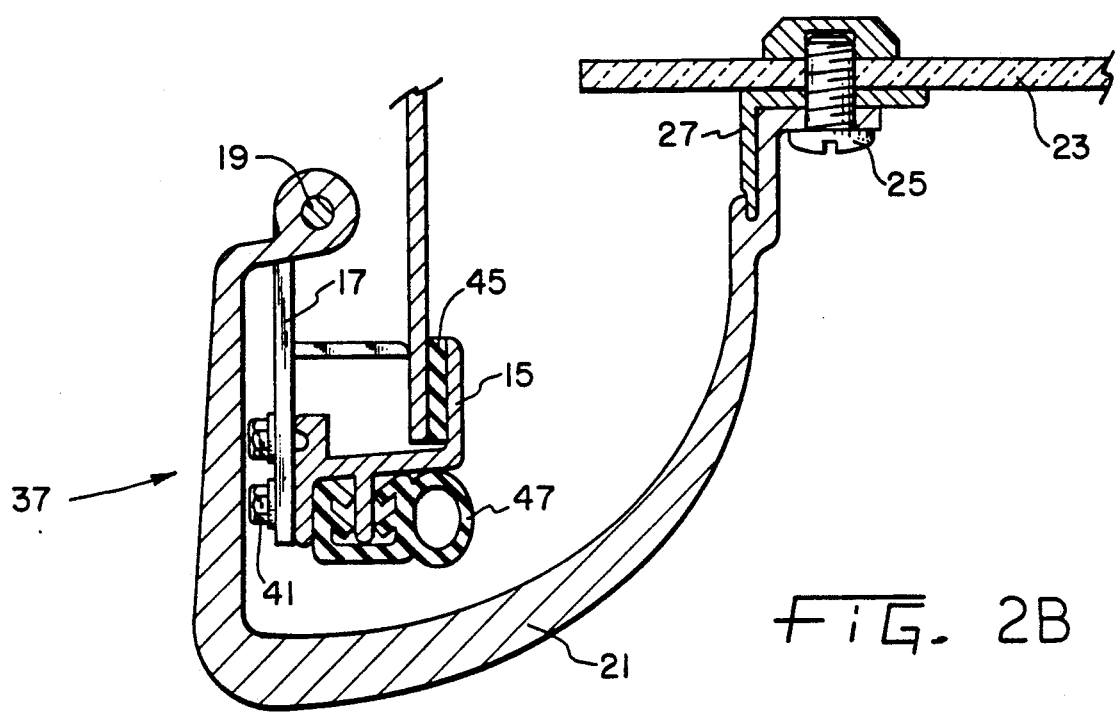
FIG. 2B is a cross-sectional view like FIG. 2A, but illustrating the window in its open position.
Figure 3:
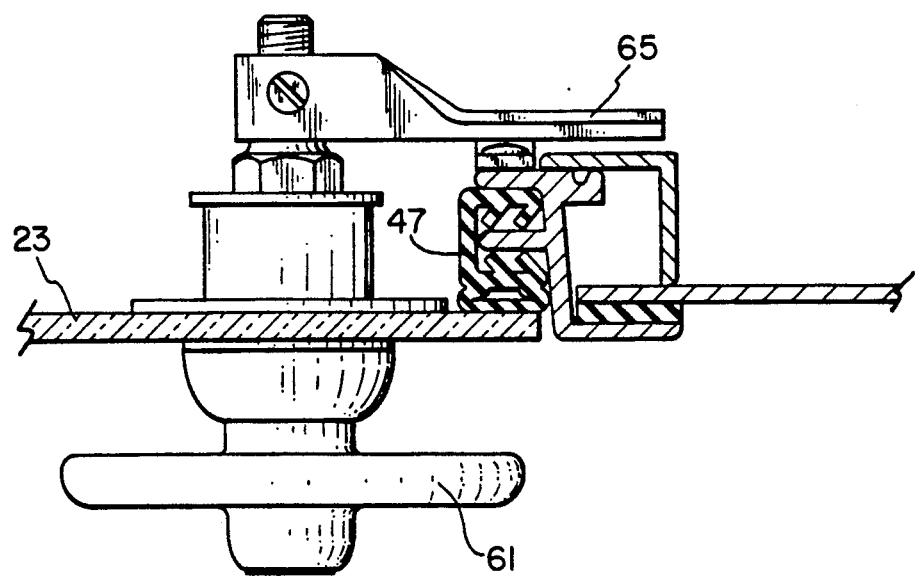
FIG. 3 is a view in cross-section along the lines 3—3 of FIG. 1.
Figure 4:
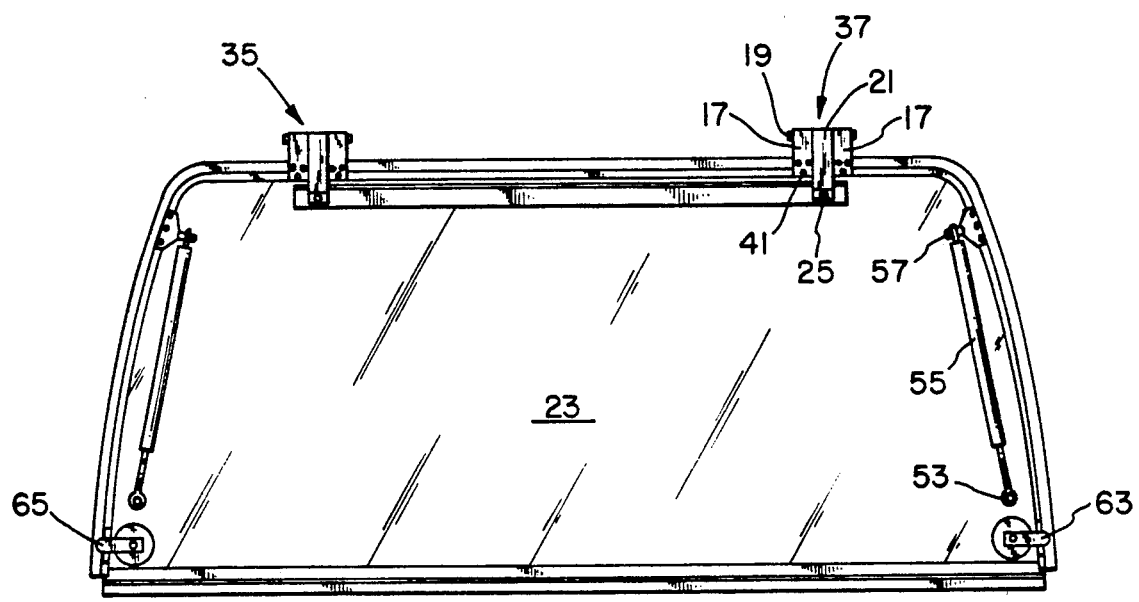
FIG. 4 is an elevation view of the window, hinges, window locks, and gas filled lift supports from inside the enclosed truck bed.

The shape of the movable portion 21 of the hinge is arcuate so as to allow ample space 49 to accommodate the inner frame 15, bolts 39 and 41 and seal 47 when the window is swung out as in FIG. 2B.

As shown, six simple holes are drilled in a window 23 of whatever shape best suits the cap to which it is to be affixed. Two of these holes accommodate the mounting bolts such as 25 which fasten the glass to the hinge portions such as 21. Two further holes accept bolts such as 53 which connect to pivotable conventional gas filled lift supports 55 which function to hold the window in its open position and which are in turn hinged to the cap at 57. Finally, a pair of lockable handles 59 and 61 have shafts extending through the glass and arms 63 and 65 on the interior side to rotataly engage or disengage the sides of the cap.

From the foregoing, it is now apparent that a novel truck body cap rear window arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A frameless truck cap lift door having a concealed hinge structure comprising:
   a transparent window portion of generally uniform thickness having at least a pair of holes along an upper edge thereof;
   a relatively rigid support bar having at least a pair of holes simultaneously alignable with the window holes;
   a pair of hinges adapted to be fastened near an upper edge of the truck cap, each hinge having a pivotable arm extending from a truck cap and terminating in an apertured flange, the spacing between the flanges when the hinges are fastened to a truck cap being substantially the same as the spacing between the holes in the support bar and the holes in the window whereby a pair of threaded fasteners may be passed each through the window, the support bar and a corresponding apertured for securing the window pivotably to the cap.

2. The frameless truck cap lift door of claim 1 further comprising a pair of rotatable door latches and a pair of braces and wherein said pair of holes are near, but spaced from the upper periphery of the window, there being six holes through the window, two for said threaded fasteners, two for rotatable door latches, and two for braces to hold the window in its open position.

3. The frameless truck cap lift door of claim 2 further comprising an interior frame portion to which the hinges are fastened, and a seal fixed to the interior frame portion and adapted to engage the inner surface of the window along the top between the pair of holes and the upper periphery.

4. The frameless truck cap lift door of claim 3 wherein each of the pivotable arms is arcuate in shape so as to allow ample space to accommodate the inner frame portion and seal when the window is swung out.

* * * * *